(12) United States Patent
Caldwell (10) Patent No.: US 10,713,730 B2
(45) Date of Patent: Jul. 14, 2020

(54) METER FOR GRAPHICALLY REPRESENTING RELATIVE STATUS IN A PARENT-CHILD RELATIONSHIP AND METHOD FOR USE THEREOF

(75) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 13/573,356

(22) Filed: Sep. 11, 2012

(65) Prior Publication Data
US 2014/0298235 A1 Oct. 2, 2014

(51) Int. Cl.
G06Q 40/00 (2012.01)
G06T 11/20 (2006.01)

(52) U.S. Cl.
CPC ........... *G06Q 40/12* (2013.12); *G06Q 40/128* (2013.12); *G06T 11/206* (2013.01)

(58) Field of Classification Search
CPC ..... G06Q 40/12; G06Q 40/128; G06T 11/206
USPC ..................... 715/772; 705/30, 32
See application file for complete search history.

(56) References Cited

U.S. PATENT DOCUMENTS

| 5,528,735 | A | 6/1996 | Strasnick et al. |
| 6,111,573 | A * | 8/2000 | McComb ............... G09G 5/363 345/661 |
| 6,812,926 | B1 | 11/2004 | Rugge |
| 6,822,662 | B1 | 11/2004 | Cook et al. |
| 7,050,997 | B1 | 5/2006 | Wood, Jr. |
| D582,934 | S | 12/2008 | Byeon |
| D613,301 | S | 4/2010 | Lee |
| 8,327,395 | B2 | 12/2012 | Lee |
| 8,380,623 | B1 | 2/2013 | Ley et al. |
| D682,305 | S | 5/2013 | Mierau |
| D682,880 | S | 5/2013 | Koehn et al. |
| D692,457 | S | 10/2013 | Abratowski et al. |
| D693,838 | S | 11/2013 | Gardner et al. |
| D694,767 | S | 12/2013 | Edwards et al. |
| D696,264 | S | 12/2013 | d'Amore |
| D696,265 | S | 12/2013 | d'Amore |
| D697,935 | S | 1/2014 | Lee |
| D699,249 | S | 2/2014 | Fujii |
| D699,250 | S | 2/2014 | Fujii et al. |
| D704,204 | S | 5/2014 | Rydenhag |
| D706,301 | S | 6/2014 | Akana |
| D706,302 | S | 6/2014 | Akana |
| D708,193 | S | 7/2014 | Agnew et al. |
| D717,823 | S | 11/2014 | Brotman |
| D721,086 | S | 1/2015 | Hontz |
| D728,615 | S | 5/2015 | Guzman |
| D735,754 | S | 8/2015 | Chaudhri |
| D736,219 | S | 8/2015 | Petersen |
| D737,278 | S | 8/2015 | Shin |

(Continued)

OTHER PUBLICATIONS

"YNAB 3 Review." Personal Finance Budget Software Reviews, Published: Jan. 7, 2010. Accessed: Jul. 15, 2014. <http://personalfinancesoftwarereviews.com/ynab-3-review>. (Archived on Jan. 7, 2010 by the Internet Archive at <http://web.archive.org/web/20100107125616/http://personalfinancesoftwarereviews.com/ynab-3-review>).*

(Continued)

*Primary Examiner* — Justin R. Blaufeld
(74) *Attorney, Agent, or Firm* — Kunzler Bean & Adamson, PC (57) ABSTRACT

A graphically depicted meter to show the status of a parent-child relationship.

16 Claims, 4 Drawing Sheets

(56) References Cited

U.S. PATENT DOCUMENTS

| | | | |
|---|---|---|---|
| D737,319 S | 8/2015 | Cavander | |
| D738,382 S | 9/2015 | Lim | |
| D738,385 S | 9/2015 | Lim | |
| D739,425 S | 9/2015 | Shawki | |
| D740,307 S | 10/2015 | McAllister | |
| D750,660 S | 3/2016 | Caldwell | |
| D751,108 S | 3/2016 | Caldwell | |
| 2003/0137541 A1* | 7/2003 | Massengale | G06F 3/0481 715/764 |
| 2003/0210279 A1* | 11/2003 | Masuda | G06Q 30/06 715/810 |
| 2004/0221258 A1 | 11/2004 | Devore et al. | |
| 2005/0222881 A1* | 10/2005 | Booker | G06Q 10/063114 705/7.15 |
| 2005/0229110 A1* | 10/2005 | Gegner | G06F 3/0481 715/800 |
| 2006/0236264 A1* | 10/2006 | Cain | G06F 3/0481 715/788 |
| 2007/0149252 A1* | 6/2007 | Jobs | H04M 15/00 455/566 |
| 2007/0260532 A1 | 11/2007 | Blake, III | |
| 2008/0163119 A1 | 7/2008 | Kim | |
| 2008/0245854 A1 | 10/2008 | Monden | |
| 2008/0256444 A1 | 10/2008 | Wang et al. | |
| 2009/0018996 A1 | 1/2009 | Hunt | |
| 2009/0048957 A1 | 2/2009 | Celano | |
| 2009/0094628 A1 | 4/2009 | Lee et al. | |
| 2010/0050123 A1 | 2/2010 | Sherrard | |
| 2010/0153242 A1* | 6/2010 | Preston | G06Q 40/00 705/30 |
| 2010/0268426 A1 | 10/2010 | Pathak | |
| 2010/0268629 A1* | 10/2010 | Ross | G06Q 10/10 705/35 |
| 2010/0333029 A1 | 12/2010 | Smith | |
| 2011/0022982 A1 | 1/2011 | Takoaka | |
| 2011/0099063 A1* | 4/2011 | Clemmons | G06Q 30/02 705/14.49 |
| 2011/0239148 A1 | 9/2011 | Setlur | |
| 2011/0271186 A1 | 11/2011 | Owens | |
| 2012/0084168 A1* | 4/2012 | Adair | G06Q 30/08 705/26.3 |
| 2012/0095887 A1 | 4/2012 | Mullen | |
| 2012/0130869 A1* | 5/2012 | Shergill | G06Q 40/02 705/30 |
| 2012/0130870 A1 | 5/2012 | Shergill et al. | |
| 2012/0215464 A1* | 8/2012 | Daubney | F24D 19/1048 702/24 |
| 2012/0323689 A1 | 12/2012 | Metcalf et al. | |
| 2013/0055136 A1* | 2/2013 | Aaron | H04L 43/045 715/772 |
| 2013/0103580 A1* | 4/2013 | Ventura | G06Q 40/02 705/40 |
| 2013/0227450 A1 | 8/2013 | Minwook | |
| 2013/0282542 A1* | 10/2013 | White | G06Q 40/00 705/35 |
| 2014/0164198 A1 | 6/2014 | Caldwell | |
| 2014/0236789 A1 | 8/2014 | Caldwell | |
| 2015/0081498 A1 | 3/2015 | Caldwell | |

OTHER PUBLICATIONS

Mecham, Jesse "YNAB 4: Spending by Category & Spending by Payee" (available at <youneedabudget.com/blog/2012/ynab-4-spending-by-category-spending-by-payee/>).*

India Investment News, Moven Partners with MoneyDesktop to Use Industry Leading API, published Mar. 13, 2014, obtained on LexisNexis at <https://advance.lexis.com/api/permalink/bc648d99-52bb-4a4e-a66f-99642f4282c3/?context=1000516>.*

PRWeb Newswire, MoneyDesktop Becomes Premier Data Provider for iQuantifi, published Sep. 11, 2014, http://www.prweb.com/releases/2014/09/prweb12163337.htm.*

BusinessWire, Q2 Partners with MX to Launch Contextual PFM Engine for Community Financial Institutions, published Aug. 1, 2016, available at http://www.businesswire.com/news/home/20160801005244/en/.*

U.S. Office Action dated Dec. 2, 2015 in U.S. Appl. No. 29/542,985.

U.S. Office Action dated Dec. 2, 2015 in U.S. Appl. No. 29/542,986.

U.S. Appl. No. 29/542,985, filed Oct. 20, 2015.

U.S. Appl. No. 29/542,986, filed Oct. 20, 2015.

U.S. Final Office Action dated May 19, 2014 in U.S. Appl. No. 13/507,601.

U.S. Office Action dated Nov. 17, 2014 in U.S. Appl. No. 13/507,601.

U.S. Office Action dated Apr. 10, 2015 in U.S. Appl. No. 13/507,601.

U.S. Office Action dated Aug. 15, 2014 in U.S. Appl. No. 13/507,602.

U.S. Office Action dated Feb. 27, 2015 in U.S. Appl. No. 13/507,602.

U.S. Office Action dated Oct. 6, 2015 in U.S. Appl. No. 13/507,602.

"Jeremy, Bundle Rolls Out New Features: Now You Can Track Your Own Spending and Create a Budget, https://web.archive.org/web/20110227205355//http://genxfinance.com/bundle-rolls-out-new-budgeting-features, Feb. 27, 2011."

"Bundle: The No. 1 Source for How People Spend and Save Money. Https://web.archive.org/web/20111004160804/http://money.bundle.com/mymoney, Oct. 4, 2011".

Mikhail_grachikov. "Deposit Photos—Stock Illustration #80752382." Deposit Photos., Jan. 18, 2012 [online], [retrieved on Jul. 8, 2016]. Retrieved from the Internet <URL: http://depositphotos.com/search/control-hub.html?AVXU2sVNbX8y4zPKyYK_=&qview=80752382>.

U.S. Appl. No. 29/553,409 Notice of Allowance, dated Jul. 14, 2016.

U.S. Appl. No. 29/553,418 Notice of Allowance, dated Jul. 21, 2016.

Derr, Andrew. "Shutter Stock—Image ID: 255006682." Shutter Stock., Jul. 11, 2012 [online], [retrieved on Jul. 8, 2016]. Retrieved from the Internet <URL: http://www.shutterstock.com/pic-255006682.html>.

3Art, Shutter Stock—Image ID: 300077855: Shutter Stock., May 24, 2011 [online], [retrieved on Jul. 8, 2016]. Retrieved from the Internet <URL: http://www.shutterstock.com/pic-300077855.html>.

U.S. Appl. No. 29/553,412 Notice of Allowance, dated Jul. 27, 2016.

U.S. Appl. No. 29/553,415 Notice of Allowance, dated Jul. 25, 2016.

U.S. Appl. No. 29/553,416 Notice of Allowance, dated Jul. 29, 2016.

U.S. Appl. No. 29/553,422 Notice of Allowance, dated Jul. 25, 2016.

U.S. Appl. No. 29/553,425 Notice of Allowance, dated Jul. 29, 2016.

U.S. Appl. No. 29/553,431 Notice of Allowance, dated Jul. 26, 2016.

U.S. Appl. No. 29/553,434 Notice of Allowance, dated Jul. 29, 2016.

U.S. Appl. No. 29/553,436 Notice of Allowance, dated Jul. 26, 2016.

U.S. Appl. No. 29/553,437 Notice of Allowance, dated Jul. 25, 2016.

U.S. Appl. No. 13/507,602, Final Office Action, dated Sep. 6, 2016.

United States Patent and Trademark Office, Final Office Action, dated Feb. 2, 2016, 36 pages, in U.S. Appl. No. 13/507,601.

United States Patent and Trademark Office, Final Office Action, dated Apr. 6, 2016, 22 pages, in U.S. Appl. No. 13/507,602.

United States Patent and Trademark Office, Notice of Allowance, dated Jan. 29, 2016, 7 pages, in U.S. Appl. No. 29/542,986.

United States Patent and Trademark Office, Notice of Allowance, dated Jan. 29, 2016, 7 pages, in U.S. Appl. No. 29/542,985.

L'Hostis et al., Vendor Landscape: Pick The Right Digital Money Management Technologies Tools and Technology: The Digital Money Management Playbook, Mar. 17, 2016, Forrester.com, Cambridge, MA.

U.S. Appl. No. 13/507,602 Office Action dated Apr. 3, 2017.

U.S. Appl. No. 13/507,601 Non-Final Office Action dated Jun. 30, 2017.

(56) References Cited

OTHER PUBLICATIONS

U.S. Appl. No. 13/507,602, Notice of Allowance, dated Oct. 15, 2019.
U.S. Appl. No. 13/507,601 Office Action dated Jan. 12, 2018.
U.S. Appl. No. 13/507,602 Examiner's Answer dated Jan. 3, 2018.
U.S. Appl. No. 13/507,601 Examiner's Answer dated Apr. 22, 2019.

* cited by examiner

METER FOR GRAPHICALLY REPRESENTING RELATIVE STATUS IN A PARENT-CHILD RELATIONSHIP AND METHOD FOR USE THEREOF

BACKGROUND

In many fields, parent-child relationships exist. It is desirable to be able to graphically represent the status of a child with respect to a parent in the parent-child relationship.

In the prior art, meters or gauges were used to depict the status of a single entity, such as the amount of fuel in a fuel tank. In addition, minor work was done depicting percentages, such as a bar graph which can show current progress versus a target number. However, the prior art failed to address the need for the ability to graphically represent the status of a parent-child relationship.

SUMMARY

A meter has been invented that graphically represents status in a parent-child relationship through a that allows a viewer to quickly ascertain whether the child is within expected norms or limits of the parent, close to those norms or limits, or has exceeded those norms or limits. A ring-type meter representation if utilized in an example implementation. The invented meter may be used to depict status in any type of parent-child relationship. For example, the percentage usage of a food budget can be depicted with the meter. Or the number of miles travelled to date on a trip can be depicted. Or the number of university credits accumulated toward graduation requirements can be depicted. Status in any type of parent-child relationship can be depicted with the invented meter.

DETAILED DESCRIPTION

For the purposes of this document, an example concerning budgeting is utilized. This example is used for illustration purposes and the scope of the invention is not limited to budgeting.

In the field of personal financial management ("PFM"), it is desirable to provide budgeting systems which allow users to budget for and track their income and expenses. The reasons why budgeting is desirable are omitted from this document. In order to provide explanatory examples that are useful to help the reader understand the invention, personal budgeting software examples are provided. The invention may be used in a wide variety of fields where parent-child relationships exist, so these examples should be considered exemplary rather than limiting in nature.

Figure 1:
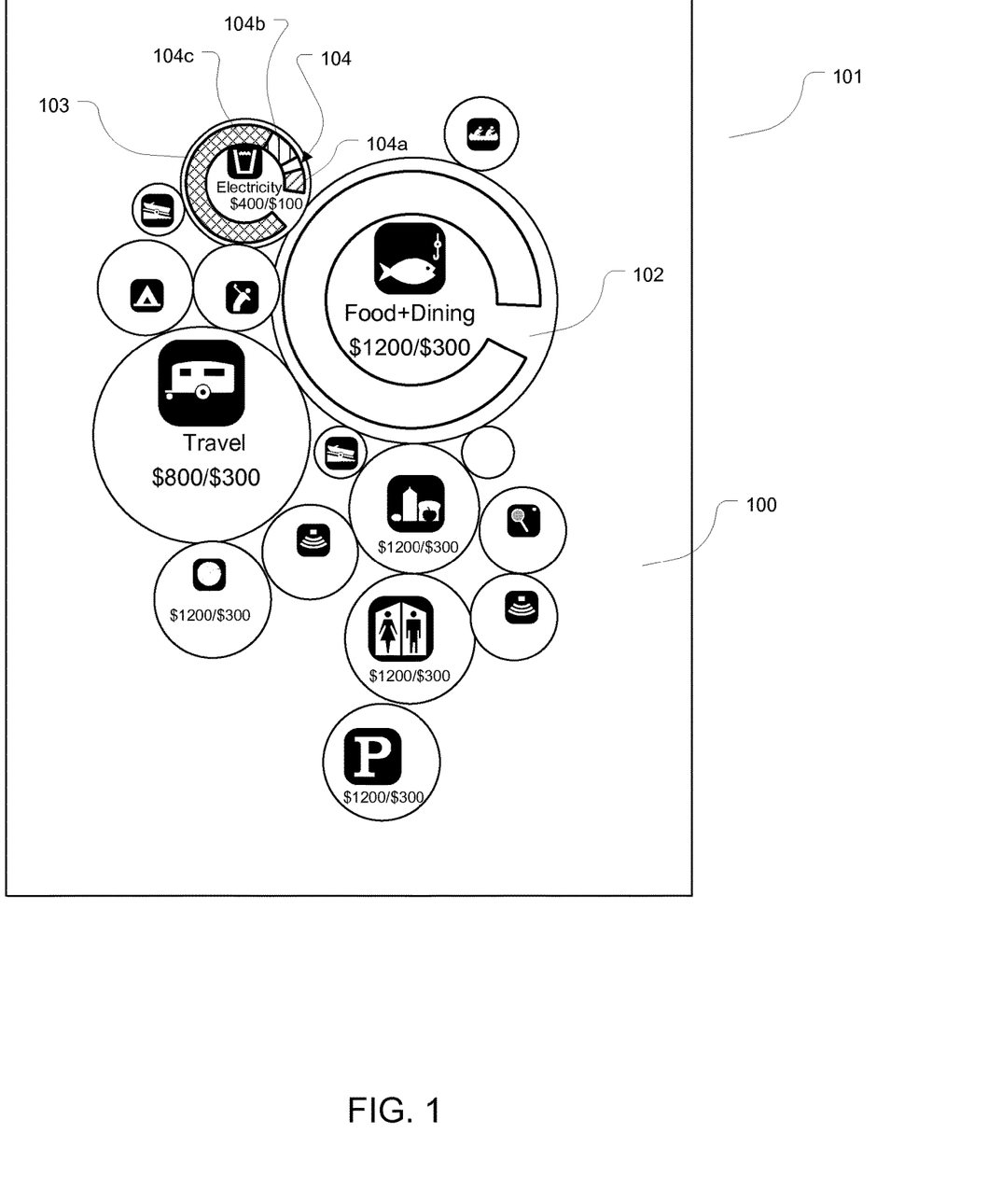
FIG. 1 depicts an explanatory diagram of parent-child relationships in a budgeting computer software package.

Referring to FIG. 1, an explanatory diagram 100 is provided that shows an example screen 101 of a mobile device running a computer software budgeting program. In this example, initially only parent categories will be displayed. In this example, the categories are depicted as bubbles. If the graphical representation for a particular parent budget is large enough when shown on a computer display device, then the logo name, and amount of that parent budget category can be shown, as well as the percent of that budget used to date. For example, the Food+Dining budget 102 is displayed with a logo of a fish, a $1200 expense amount displayed, and a $300 amount displayed. This allows a user to immediately acquire salient budget information from the screen of a computer, such as a mobile or hand held device. As the budget amount shrinks, the software may (or may not) also shrink the corresponding graphical representation. In that event, the software can show as much relevant data as possible, but some items may need to be omitted.

From the parent budget, the user can see the status of child budgets through a child meter. For example, a child meter 104 is provided that depicts a budget 103 for electricity expenses. This example shows the budget 103 as a circular bubble representation although other shapes could be used as well. A light bulb logo is shown to indicate the concept of electricity usage. The electricity budget 103 is shown to have a $400 budget with $100 of that budget used to date due to electricity bills. Continuing with this example, the parent budget 103 of electricity has its children's status indicated at the parent level through a budget meter 104. The budget meter 104 exemplified in this instance is a circular ring within the parent budget widget. The budget meter 104 can display:

(a) Portion of spending of a child budget within the parent budget that has exceeded its budgeted amount 104a (also can be indicated by a color such as red), (b) Portion of spending of a child budget within the parent budget that is close to exceeding its budgeted amount 104b (also can be indicated by a color such as yellow), and (c) Portion of a child budget within the parent budget that is within its budgeted amount 104c (also can be indicated by a color such as green).

In the example of FIG. 1, if the parent budget category is over budget, such as with budget 102, then the children are not displayed. If desired, the software could be written to display them.

Figure 2:
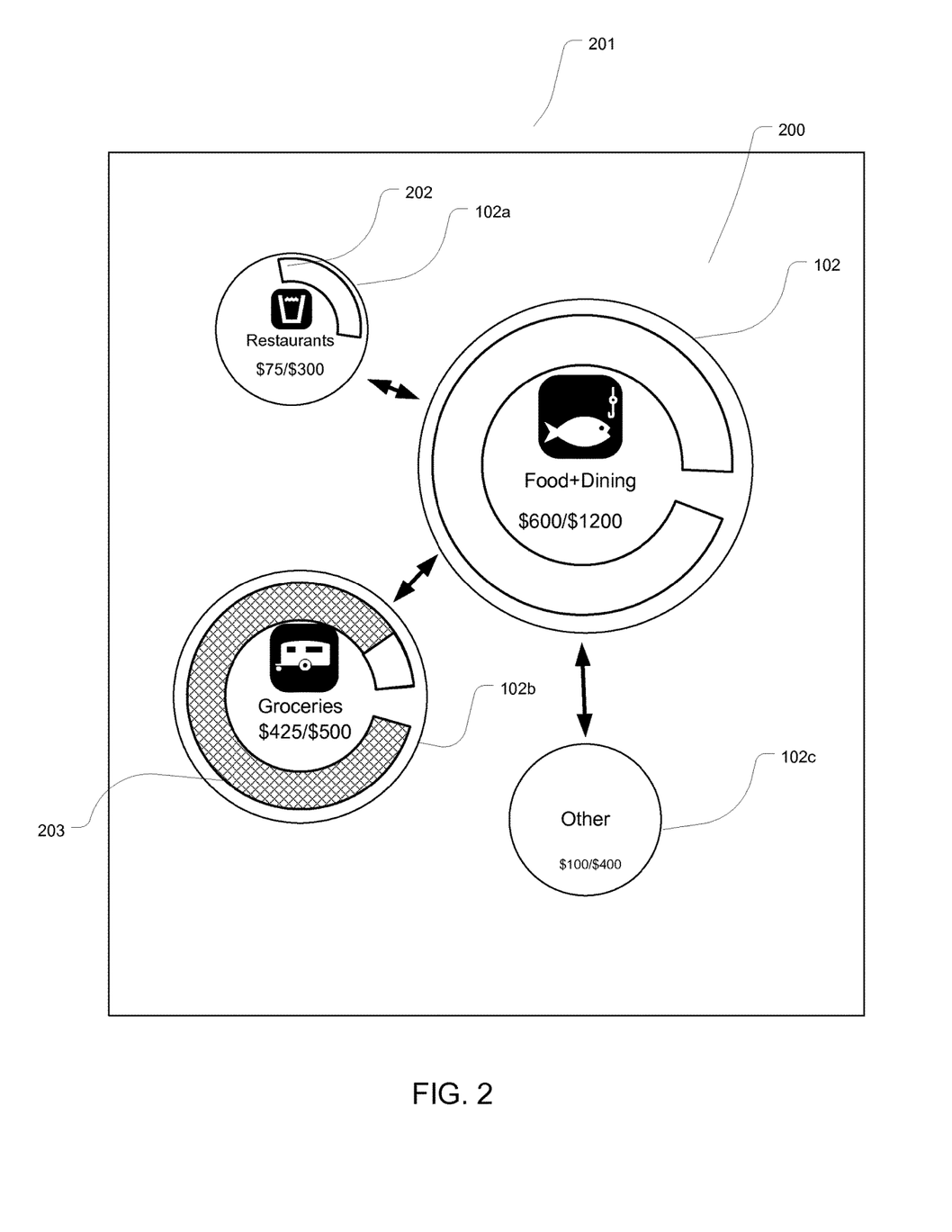
FIG. 2 depicts an explanatory diagram of parent-child relationships per FIG. 1.

Referring to FIG. 2, an explanatory diagram 200 is provided that shows an example screen 201 of a mobile device running a computer software budgeting program, per FIG. 1. In this example, to see child budgets within the parent budget, the user simply drills down into the parent. In this example, that may be achieved by clicking on the parent budget 102 in order to access child budgets 102a, 102b, 102c, etc. For 102a, a Restaurants budget meter 202 is depicted showing about that proportion of the Restaurants child budget that has been utilized, such as ¼ or 25 percent. For 102b Groceries, a child budget meter 203 is provided that graphically depicts the proportion of the child budget as been used, such as about $425 out of $500 or 85 percent. When the parent budget is drilled into, the child budgets may be displayed connected to it if desired. In this particular example, the "Other" child budget 102c represents spending that was not budgeted for.

Figure 3:
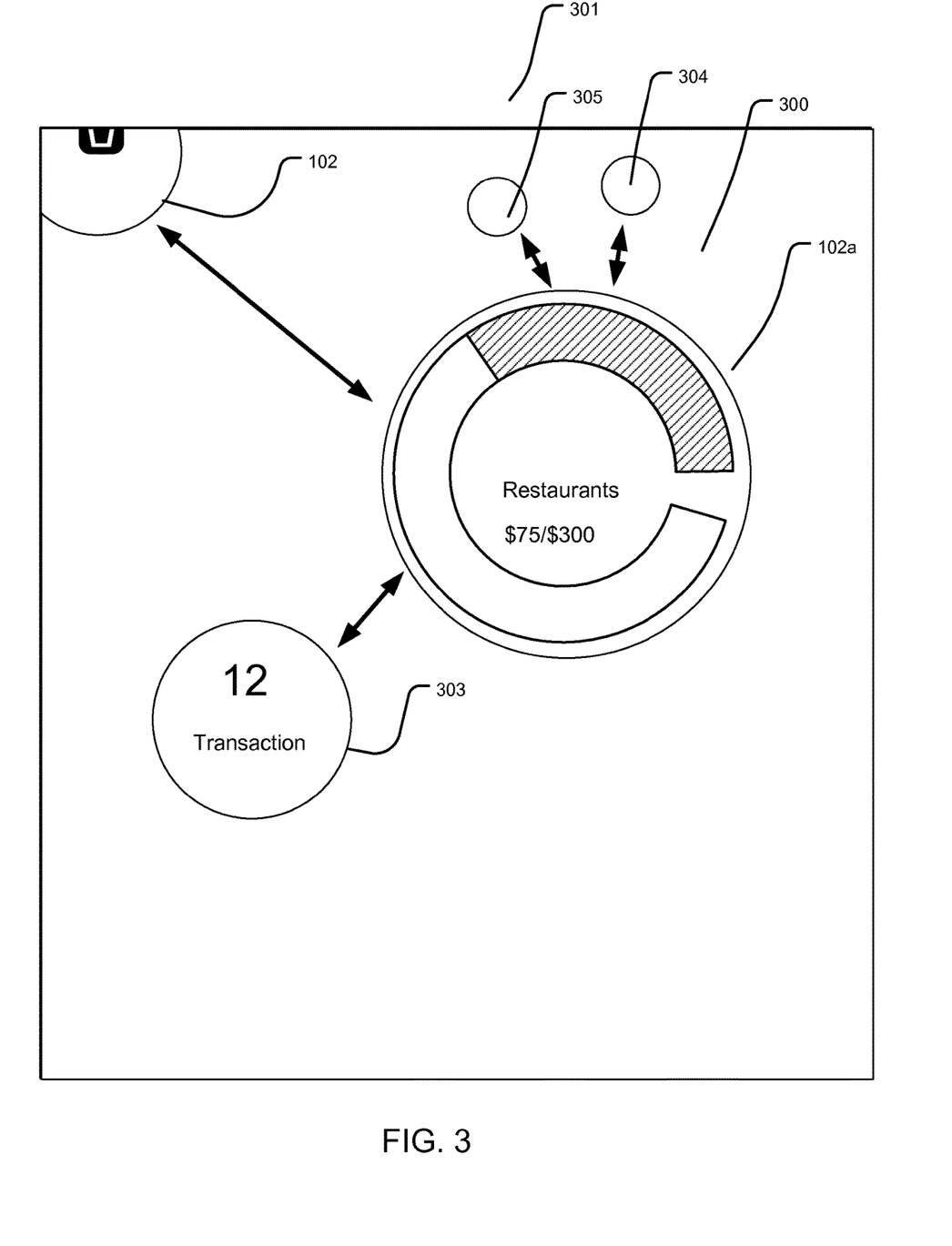
FIG. 3 depicts an explanatory diagram of parent-child relationships per FIGS. 1 and 2.

Referring to FIG. 3, an explanatory diagram 300 is provided that shows an example screen 301 of a mobile device running a computer software budgeting program, per FIGS. 1 and 2. In this example, the user has elected to view details of a child budget 102a—Restaurants. $75 of the $300 restaurant budget has been used, for a 25% usage rate. Within the child budget, there are 12 transactions 303 which can be drilled into if desired. From this page, the user can delete 304 the budget or edit 305 its details.

Figure 4:
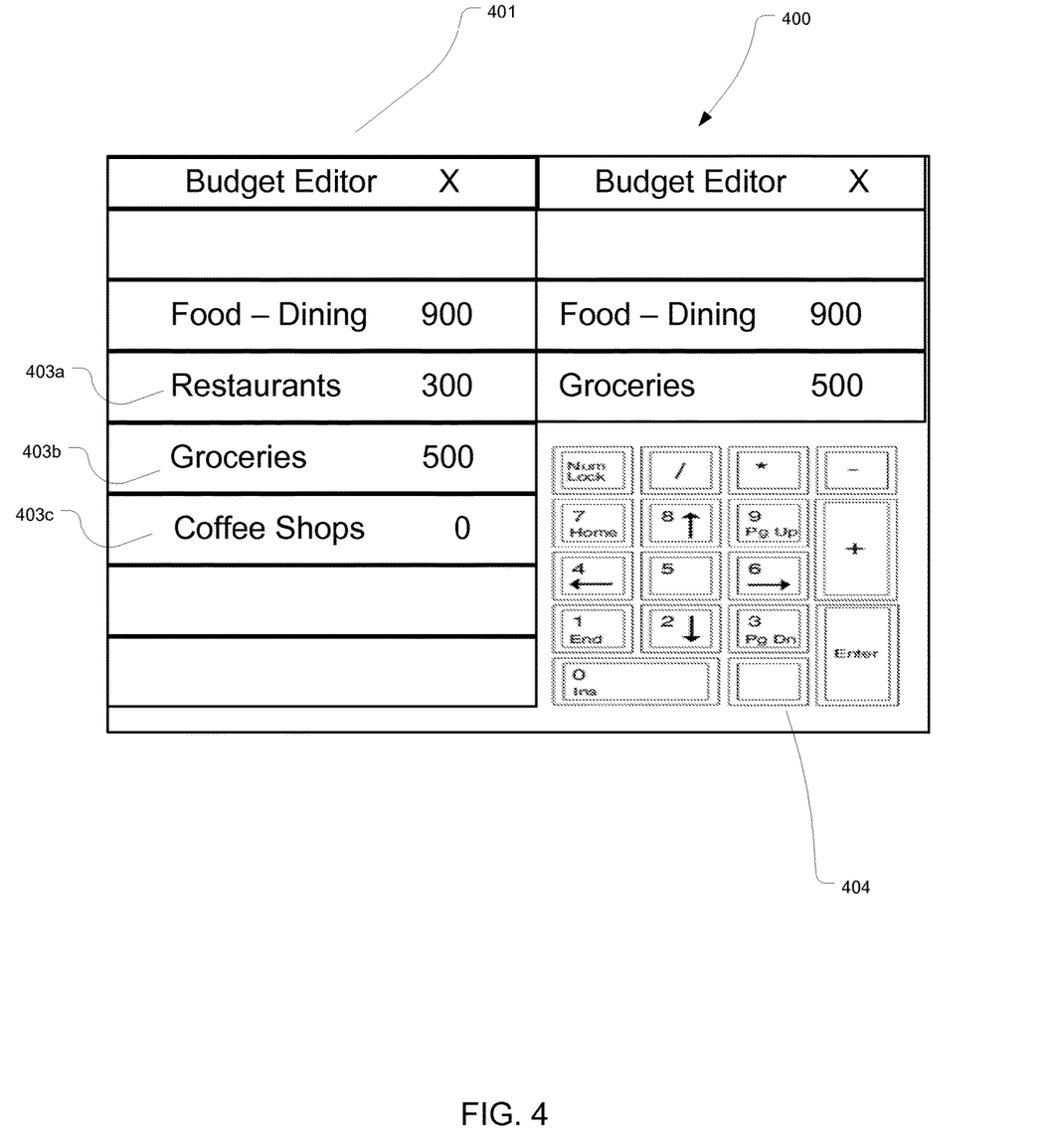
FIG. 4 depicts an explanatory diagram of parent-child relationships per FIGS. 1-3, with line items shown.

Referring to FIG. 4, an explanatory diagram 400 is provided that shows an example screen 401 of a mobile device running a computer software budgeting program, per FIGS. 1-3. In this example, the user has chosen to edit 305 the details of the budget 102a. Editing the budget causes the parent budget and the children to be listed with the ability to in-line edit each value. For example, in 401 we see the ability to edit individual transactions 403a, 403b and 403c by use of a keypad 404.

For the purposes of this document, a meter for use in indicating the status of a child within a parent-child relationship has been discussed. The meter may be used to meter, quantify, measure, depict, estimate, gauge, approximate, judge, calculate, figure, compare, or otherwise evaluate the status of the parent-child relationship. In the example of FIG. 1, the electricity budget 103 has a parent-child relationship meter 104 that graphically indicates 25% of the electricity budget has been used by shading 25% or 90 degrees of the 360 degree budget meter. Other graphic methods may be used to indicate the parent-child relationship status as well.

The meter has been discussed so far arc as a device, such as a graphical representation of the relative status of a parent-child relationship. But the meter can also be discussed as a method. When considering the meter as a method, it could be considered a method for graphically displaying the status of a child in a parent-child relationship by displaying a meter that shows the entire potential of a parent-child relationship, as well as graphically depicting the progress of the child in reaching that full potential. That progress or status may be considered a percentage or a proportion if desired.

The invention can be implemented as software that runs on a digital computer. The state of technology and trends as of the time of writing this document indicates that digital computers running software will be a preferred implementation for many years to come. For the purposes of this document, the term "digital computer" includes desktop computers, laptop computers, tablet computers, hand-held mobile electronic devices (including so-called smart phones), other mobile electronic devices, networked computers, mainframe computers, and other computing devices. Other computing devices may include analog computing devices, quantum computing devices, biological computing devices and other computing devices. Although the invention can be implemented as software operating on a computing device, the invention can also be implemented as firmware or it may be implemented in hardware or otherwise as desired. Such implementations are intended to be within the scope of the invention. Commonly a computing device for using the invention will include a display device such as a screen or other image on which information can be displayed to a user, an input device through which a user can control the computing device, and a processor for carrying out computations as required by the invention. The computing device may also include a means for carrying wireless transmission and receipt of data, dynamic memory, static memory, a power source such as a battery, and other features.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for graphically displaying status of a parent-child relationship in a computer system, the method comprising:

retrieving budgeting data from computer memory wherein the budgeting data comprises parent budget data and child budget data, displaying the budgeting data using the computer system to graphically depict a parent budget, as a circular bubble having a perimeter, and a child budget meter, as a circular ring positioned within the circular bubble and running parallel to but spaced apart from the perimeter of the circular bubble by a gap, in a parent-child budgeting relationship on a display device of the computer system, the child budget meter illustrating both:

(a) potential of the parent-child budgeting relationship, and (b) progress of the child budget meter toward or beyond the potential of the parent-child budgeting relationship, with the circular ring of the child budget meter divided into multiple child arcs each representing one of multiple child budgets of the parent budget, each child arc independently colored to represent whether the represented child budget is within, is close to exceeding, or has exceeded its budgeted amount;

displaying a budget name, a budgeted amount, an expenses amount, a percentage of budget used, and a representative symbol for the parent budget in the circular bubble inside the circular ring;

continuously monitoring a budgeted amount of the parent budget;

detecting that the budgeted amount of the parent budget is less than an original budgeted amount of the parent budget;

adjusting, dynamically, a size of the circular bubble representing the parent budget to correspond to the detected budgeted amount of the parent budget in response to detecting that the budgeted amount of the parent budget has changed, the circular bubble representing the parent budget shrinking to represent the change in the budgeted amount of the parent budget being less than the original budgeted amount of the parent budget;

eliminating, dynamically, the display of one or more of the budget name, the percentage of budget used, the budgeted amount, the expenses amount, and the representative symbol in response to the circular bubble representing the parent budget shrinking based on determining that the change in the budgeted amount of the parent budget is less than the original budgeted amount of the parent budget;

determining that a total amount of expenses of the multiple child budgets of the parent budget is greater than the budgeted amount of the parent budget; and preventing display of the child budget meter within the circular bubble representing the parent budget in response to determining that the total amount of expenses of the multiple child budgets is greater than the budgeted amount of the parent budget.

2. The method as recited in claim 1, wherein the multiple child arcs of the circular ring include:

a first child arc colored green to represent that the represented child budget is within its budgeted amount;

a second child arc colored yellow to represent that the represented child budget is close to exceeding its budgeted amount; and a third child arc colored red to represent that the represented child budget has exceeded its budgeted amount.

3. The method as recited in claim 1, wherein the circular bubble is:

colored green to represent that the represented parent budget is within its budgeted amount;

colored yellow to represent that the represented parent budget is close to exceeding its budgeted amount; or colored red to represent that the represented parent budget has exceeded its budgeted amount.

4. The method as recited in claim 3, wherein the coloring of the circular bubble appears both in a portion of the circular bubble that is positioned inside the circular ring as well as in a portion of the circular bubble that is positioned in the gap between the circular ring and the perimeter of the circular bubble.

5. The method as recited in claim 1, further comprising:

receiving a selection of the circular bubble from a user; and in response to the selection, displaying additional circular bubbles representing each of the child budgets around, and each with a line connected to, the circular bubble representing the parent budget.

6. The method as recited in claim 1, wherein a length of each child arc also independently signifies a portion of a budgeted amount of the parent budget made up by an expenses amount of the represented child budget.

7. A system, including a processor, for graphically representing budgeting status in a parent-child budgeting relationship on a display device of a computer system, the system comprising:

a child budget meter, rendered by the processor, for graphically representing budgeting status of the parent-child budgeting relationship, and a graphically represented parent budget rendered by the processor, wherein:

the parent budget's totality represents potential of the parent-child budgeting relationship;

the parent budget is rendered as a circular bubble having a perimeter and the child budget meter is rendered as a portion of a circular ring positioned within the circular bubble and running parallel to but spaced apart from the perimeter of the circular bubble by a gap with the circular ring of the child budget meter divided into multiple child arcs each representing one of multiple child budgets of the parent budget, each child arc independently colored to represent whether the represented child budget is within, is close to exceeding, or has exceeded its budgeted amount;

a budget name, a budgeted amount, an expenses amount, a percentage of budget used, and a representative symbol for the parent budget is displayed in the circular bubble inside the circular ring;

a budgeted amount of the parent budget represented by the graphical representation is continuously monitored;

the budgeted amount of the parent budget is detected to be less than an original budgeted amount of the parent budget;

a size of the circular bubble representing the parent budget is dynamically adjusted to correspond to the detected budgeted amount of the parent budget in response to detecting that the budgeted amount of the parent budget has changed, the circular bubble representing the parent budget shrinking to represent the change in the budgeted amount of the parent budget being less than the original budgeted amount of the parent budget;

the display of one or more of the budget name, the percentage of budget used, the budgeted amount, the expenses amount, and the representative symbol is dynamically eliminated in response to the circular bubble representing the parent budget shrinking based on determining that the change in the budgeted amount of the parent budget is less than the original budgeted amount of the parent budget;

a total amount of expenses of the multiple child budgets of the parent budget is determined to be greater than the budgeted amount of the parent budget; and display of the child budget meter within the circular bubble representing the parent budget is prevented in response to determining that the total amount of expenses of the multiple child budgets is greater than the budgeted amount of the parent budget.

8. The system as recited in claim 7, wherein the multiple child arcs of the circular ring include:

a first child arc colored green to represent that the represented child budget is within its budgeted amount;

a second child arc colored yellow to represent that the represented child budget is close to exceeding its budgeted amount; and a third child arc colored red to represent that the represented child budget has exceeded its budgeted amount.

9. The system as recited in claim 7, wherein the circular bubble is:

colored green to represent that the represented parent budget is within its budgeted amount;

colored yellow to represent that the represented parent budget is close to exceeding its budgeted amount; or colored red to represent that the represented parent budget has exceeded its budgeted amount.

10. The system as recited in claim 9, wherein the coloring of the circular bubble appears both in a portion of the circular bubble that is positioned inside the circular ring as well as in a portion of the circular bubble that is positioned in the gap between the circular ring and the perimeter of the circular bubble.

11. The system as recited in claim 7, wherein a budget name, a budgeted amount, an expenses amount, a percentage of budget used, and a representative symbol for the parent budget are rendered in the circular bubble inside the circular ring.

12. A method for graphically displaying a parent-child budgeting relationship in a computer system, the method comprising:

providing a plurality of parent budgets with each parent budget representing a separate category of spending and with each parent budget having a budgeted amount of its category of spending and an expenses amount of its category of spending;

providing, for each parent budget, at least two corresponding child budgets with each child budget representing a separate subcategory of spending and with each child budget having a budgeted amount of its subcategory of spending and an expenses amount of its subcategory of spending, the budgeted amount of each parent budget including the sum of the budgeted amounts of its corresponding child budgets, the expenses amount of each parent budget including the sum of the expenses amounts of its corresponding child budgets;

for each parent budget of the plurality of parent budgets:
  displaying an interactive circular bubble representing the parent budget;
  displaying a child budget meter, as a circular ring inside the interactive circular bubble, representing the child budgets corresponding to the parent budget; and
  shading a fraction of the circular ring that is proportional to progress of the expenses amount of the parent budget toward the budgeted amount of the parent budget; and for each child budget corresponding to one of the plurality of parent budgets:
  partitioning a portion of the shaded fraction of the circular ring with a length of the portion being proportional to the expenses amount of the child budget relative to the budgeted amount of the parent budget;
  coloring the portion a first color when the expenses amount of the child budget is within its budgeted amount;
  coloring the portion a second color when the expenses amount of the child budget is close to exceeding its budgeted amount;
  coloring the portion a third color when the expenses amount of the child budget has exceeded its budgeted amount;
  displaying a budget name, a budgeted amount, an expenses amount, a percentage of budget used, and a representative symbol for the parent budget in the interactive circular bubble inside the circular ring;
  continuously monitoring a budgeted amount of the parent budget;
  detecting that the budgeted amount of the parent budget is less than an original budgeted amount of the parent budget;
  adjusting, dynamically, a size of the circular bubble representing the parent budget to correspond to the detected budgeted amount of the parent budget in response to detecting that the budgeted amount of the parent budget has changed, the circular bubble representing the parent budget shrinking to represent the change in the budgeted amount of the parent budget being less than the original budgeted amount of the parent budget;
  eliminating, dynamically, the display of one or more of the budget name, the percentage of budget used, the budgeted amount, the expenses amount, and the representative symbol in response to the circular bubble representing the parent budget shrinking based on determining that the change in the budgeted amount of the parent budget is less than the original budgeted amount of the parent budget;
  determining that a total amount of expenses of the multiple child budgets of the parent budget is greater than the budgeted amount of the parent budget; and
  preventing display of the child budget meter within the circular bubble representing the parent budget in response to determining that the total amount of expenses of the multiple child budgets is greater than the budgeted amount of the parent budget.

13. The method as recited in claim 12, wherein:
the first color is green;
the second color is yellow; and
the third color is red.

14. The method as recited in claim 12, further comprising, for each parent budget of the plurality of parent budgets:
  coloring the interactive circular bubble representing the parent budget green when the expenses amount of the child budget is within its budgeted amount;
  coloring the interactive circular bubble representing the parent budget yellow when the child budget is close to exceeding its budgeted amount; and
  coloring the interactive circular bubble representing the parent budget red when the child budget has exceeded its budgeted amount.

15. The method as recited in claim 14, wherein the coloring of the interactive circular bubble representing each parent budget appears both in a portion of the interactive circular bubble that is positioned inside the circular ring as well as in a portion of the interactive circular bubble that is positioned in a gap between the circular ring and a perimeter of the interactive circular bubble.

16. The method as recited in claim 12, further comprising, for one of the parent budgets of the plurality of parent budgets:
  receiving a selection of the interactive circular bubble representing the parent budget from a user; and
  in response to the selection, displaying a circular bubble representing each of the child budgets corresponding to the parent budget around, and with a line connected to, the interactive circular bubble representing the parent budget.

* * * * *